Jan. 11, 1955

C. H. SCOTT 2,699,215

HORSESHOE CONSTRUCTED TO PREVENT CLICKING

Filed May 1, 1951

INVENTOR
Clarence H. Scott

BY Mason, Fenwick & Lawrence
ATTORNEYS

United States Patent Office 2,699,215
Patented Jan. 11, 1955

2,699,215

HORSESHOE CONSTRUCTED TO PREVENT CLICKING

Clarence H. Scott, Leesburg, Va.

Application May 1, 1951, Serial No. 224,012

1 Claim. (Cl. 168—24)

This invention relates to horseshoes, and particularly to a special shoe for the fore feet, designed to prevent "clicking."

"Clicking," known also as "forging," is the action of the horse when running, of striking the rear of the front shoes by the toes or quarters of the rear shoes, making a metallic sound which is implied in the name of the action. The sound is not only disagreeable to the rider, but it announces a defect, for repeated blows endanger the retention of the front shoes, while collision of the front and rear shoes is an interruption to the horse's stride, and in many instances has caused the horse to stumble. The evil of "clicking" is likely to be most troublesome in racing, when the horse in his eagerness to go forward, brings the toes of the hind feet down upon the rear ends of the front shoes at the moment when the front feet are breaking, that is, when they are tilted up with the toes touching the ground, about to leave the ground.

One of the objects of the present invention is to provide a horseshoe for the fore feet constructed to prevent "clicking."

Another object of the invention is to provide a horseshoe of the type described, shaped to facilitate the necessary precise fitting of the shoe.

Other objects of the invention will appear as the following description of a preferred and practical embodiment thereof proceeds.

In the drawing, in which the same reference characters have been used to denote identical parts in the several figures.

Figure 1:
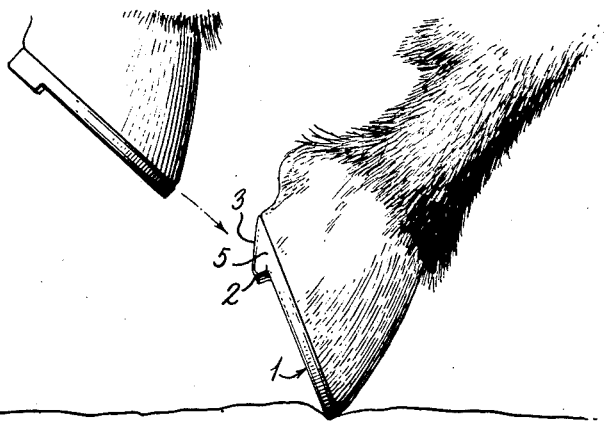
Figure 1 is a side elevation showing a position of the fore and hind feet of a horse conducive to "clicking"
Figure 2:
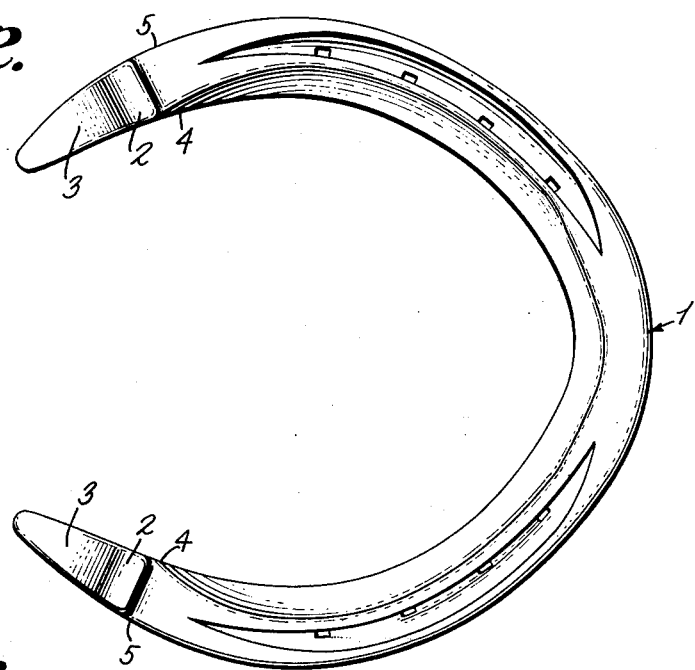
Figure 2 is a bottom plan view of a horseshoe embodying the principles of the invention.
Figure 3:
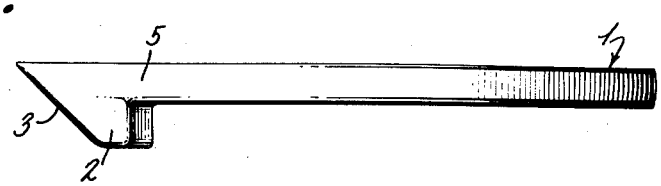
Figure 3 is a side elevation of the horseshoe.

Referring now in detail to the several figures, and first adverting to Figure 1, this shows the relative positions of the fore and hind feet of a racing horse at the end of a stride, the fore foot being tilted up with the toe touching the ground, about to break contact with the ground. The hind foot is descending, toe downward, in an arc which brings the rear end of the front shoe substantially into the path of descent of the rear shoe. If the heels of the front shoe are perpendicular to the plane of the bottom of the foot, or if the front shoe is provided with calks, the rear faces of which are similarly perpendicular, the front of the rear shoe will collide abruptly with the perpendicular face of the front shoe, suddenly limiting the stride of the rear leg of the horse, with a good chance of the front foot being pinned down at the instant when the horse must lift it, causing the horse to stumble. This gives a fair illustration of what is meant by "clicking" or "forging" and its more serious results.

In the drawing, the numeral 1 represents a horseshoe, the front part of which is of conventional shape and construction, having calks 2 at the heels, characterized by having the rear faces 3 of the heels including the calks, slope downwardly and forwardly at a small angle to the plane of the upper face of the horseshoe. This type of shoe is shown in Figure 1, it being understood that if the rear shoe comes down against the front shoe it will cam down the inclined faces 3 at the rear of the heels, passing behind the front shoe without checking the stride of the hind leg and without the possibility of the fore foot being impeded by the hind foot in its effort to break.

In the illustrated embodiment of the invention the angle of slant of the inclined face 2, with respect to the upper face of the horseshoe, is about 30°. However, the angle is not critical up to a practical limit of about 45°. The plane of the inclined face intersects the plane of the upper face of the horseshoe in a thin edge at the rear of the heels.

The horseshoe should be precisely fitted to ensure that the heels do not extend beyond the hoof. Otherwise, a ledge is formed by the rearwardly projecting portions of the heels against which the rear shoes might impinge, nullifying the anticlicking virtues of the invention. To facilitate trimming down the shoe if it is found to be a little too long, the heel portions are laterally tapered to their ends to correspond to the shape and width of the rind or horny wall of the hoof which rests upon it, forming convergent inner and outer faces 4 and 5 which meet the inclined faces 3 at a substantial apex in the plane of the upper face of the horseshoe. By filing the inclined faces 3 near their upper ends, so as to somewhat steepen the bevel, but keeping the angle within the practical limit of 45°, the upper face of the horseshoe can be cut back a quarter of an inch or more without requiring the removal of a great deal of metal.

While the illustrated embodiment of the invention shows a horeshoe with calks at the heels, the invention may be equally well applied to a shoe having no calks.

While I have in the above description disclosed what I believe to be a preferred and practical embodiment of the invention, it will be understood by those skilled in the art that the details of construction and arrangement of parts as illustrated and described, are by way of example and not to be construed as limiting the scope of the invention.

What I claim is:

Fore horseshoe construction to ward off the rear shoe in foot interference known as "clicking," said horseshoe having a substantially planiform upper face and downwardly projecting calks at the heel ends, the rear faces of said heel ends including said calks being planiform and inclined forwardly and downwardly at an angle to the plane of said upper face not exceeding 45°, having its apex in said plane.

References Cited in the file of this patent

UNITED STATES PATENTS

| Number | Name | Date |
|---|---|---|
| 356,007 | Nelson | Jan. 11, 1887 |
| 507,276 | Kline | Oct. 24, 1893 |
| 562,505 | Weekes | June 23, 1896 |
| 1,212,592 | Walsh | Jan. 16, 1917 |
| 1,955,030 | Smith | Apr. 17, 1934 |
| 2,197,166 | Wheeler et al. | Apr. 16, 1940 |

FOREIGN PATENTS

| Number | Country | Date |
|---|---|---|
| 9,861 | Great Britain | Aug. 8, 1843 |
| 354,214 | France | Oct. 2, 1905 |
| 387,410 | France | July 9, 1908 |
| 426,843 | France | July 19, 1911 |
| 199,873 | Great Britain | July 5, 1923 |